US009207061B2

(12) United States Patent
Yamasaki et al.

(10) Patent No.: US 9,207,061 B2
(45) Date of Patent: Dec. 8, 2015

(54) MAGNETIC-POLE POSITION DETECTION APPARATUS FOR SYNCHRONOUS MACHINES

(75) Inventors: Hisanori Yamasaki, Tokyo (JP); Keita Hatanaka, Tokyo (JP); Masaki Kono, Tokyo (JP); Hidetoshi Kitanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 609 days.

(21) Appl. No.: 13/699,797

(22) PCT Filed: Apr. 11, 2011

(86) PCT No.: PCT/JP2011/059008
§ 371 (c)(1),
(2), (4) Date: Nov. 26, 2012

(87) PCT Pub. No.: WO2011/162011
PCT Pub. Date: Dec. 29, 2011

(65) Prior Publication Data
US 2013/0073252 A1 Mar. 21, 2013

(30) Foreign Application Priority Data

Jun. 21, 2010 (JP) ................................. 2010-140411

(51) Int. Cl.
G06F 19/00 (2011.01)
G01B 7/14 (2006.01)
H02P 6/18 (2006.01)
G01B 7/30 (2006.01)

(52) U.S. Cl.
CPC .. *G01B 7/14* (2013.01); *G01B 7/30* (2013.01); *G06F 19/00* (2013.01); *H02P 6/18* (2013.01)

(58) Field of Classification Search
CPC ...... H02P 21/146; H02P 6/18; H02P 21/0035
USPC .................. 702/57–66, 75–79, 150, 182–185
See application file for complete search history.

(56) References Cited

U.S. PATENT DOCUMENTS

2001/0009359 A1 7/2001 Kinpara et al.
2007/0085508 A1* 4/2007 Fujitsuna et al. ............. 318/712

FOREIGN PATENT DOCUMENTS

JP 4271397 6/2009

OTHER PUBLICATIONS

International Search Report Issued Jun. 7, 2011 in PCT/JP11/59008 Filed Apr. 11, 2011.

* cited by examiner

*Primary Examiner* — Edward Raymond
(74) *Attorney, Agent, or Firm* — Oblon, McClelland, Maier & Neustadt, L.L.P.

(57) ABSTRACT

An object is to provide a magnetic-pole position detection apparatus for synchronous machines that allows a desired accuracy of magnetic-pole position detection regardless of variation in DC voltage of a DC voltage source. Calculation means (2a) changes a pulse width (tp) and a pulse-quiescent width (tn) in accordance with a DC voltage detection value (Vdc), using a pulse width determination section (22a), such that a desired accuracy of magnetic-pole position detection can be obtained regardless of variation in DC voltage of a DC voltage source (5). The calculation means (2a) also performs control such that a sampling timing is fixed at the end point of the pulse width (tp) of voltage vectors regardless of the DC voltage detection value (Vdc).

7 Claims, 9 Drawing Sheets

MAGNETIC-POLE POSITION DETECTION APPARATUS FOR SYNCHRONOUS MACHINES

TECHNICAL FIELD

The present invention relates to a magnetic-pole position detection apparatus for synchronous machines that can detect a magnetic-pole position of a synchronous motor/synchronous generator easily, unfailingly, and highly accurately, without using a position detector.

BACKGROUND ART

When a magnetic-pole position of a synchronous machine is detected, a method of directly detecting an electric angle (magnetic-pole position) of a rotor using a position detector such as an encoder may be employed. However, in order to directly detect a rotation angle of the rotor, a sensor specialized for magnetic-pole position detection, such as a position detector, needs to be added to the synchronous machine. This causes disadvantages that the size of the apparatus configuration becomes large, and economic efficiency is also reduced. Therefore, apparatuses that detect a magnetic-pole position of a synchronous machine without using a position detector have been proposed.

As the methods for detecting a magnetic-pole position of a synchronous machine without using a position detector, for example, there are methods that use induced voltage or saliency of the synchronous machine.

In the case of position sensorless control using induced voltage, when the speed is zero, the position of a rotor cannot be precisely estimated since the induced voltage is also zero. In the case of a method using saliency, the saliency used for magnetic-pole position estimation varies with a period twice as long as that of the magnetic-pole position, and therefore the period of the estimated position is also twice as long as that of the magnetic-pole position. That is, the value of the estimated position when the magnetic-pole position of the synchronous machine is in a range of 0 to 180 degrees is the same as that when the magnetic-pole position of the synchronous machine is in a range of 180 to 360 degrees. Accordingly, this method is not sufficient to detect the magnetic-pole position for certain.

Therefore, at least when a synchronous machine is started up from the state where the speed is nearly zero, a method for estimating magnetic-pole position information of the synchronous machine is needed other than the method using saliency. As such a method, for example, Patent Document 1 discloses a method that uses magnetic saturation of a synchronous machine.

According to this method, 2n voltage vectors (n represents the number of phases and is a natural number larger than or equal to three) which have equal amplitudes and whose phases are shifted by equal amounts are applied to a synchronous machine, and added current values are obtained by adding up detection values of electric currents flowing when each pair of voltage vectors whose phase difference is 180 degrees is applied. A magnetic-pole position is detected based on the added current values. Thus, it is required that the synchronous machine enters magnetic saturation state due to the application of the voltage vectors.

CITATION LIST

Patent Document

Patent Document 1: Japanese Patent Publication No. 4271397 (page 10, line 18 to page 13, line 50, paragraphs [0045] to [0065], and FIGS. 1 to 5, and 7)

SUMMARY OF THE INVENTION

Problems to be Solved by the Invention

When the magnetic-pole position detection method of Patent Document 1 is used, electric current sufficient for magnetic saturation of a synchronous machine needs to be fed as described above. This is because the method utilizes the following principle. If magnetic saturation does not occur, an electric current that flows when applying a voltage vector with a phase close to a magnetic-pole position is equal to an electric current that flows when applying a voltage vector with a phase different by 180 degrees from the phase close to the magnetic-pole position. On the other hand, if magnetic saturation occurs, the former electric current is higher than the latter, and the magnetic-pole position can be detected based on the differential electric currents.

Accordingly, in order to obtain magnetic saturation state that ensures a required accuracy of magnetic-pole position detection, it is necessary to previously adjust and set application time of a voltage vector instruction to be applied to the synchronous machine.

In the case of a product in which the value of a voltage supplied from a DC voltage source to a power converter that generates the voltage vectors is not constant, it is sometimes difficult to set the voltage vector application time. For example, in the case of a power converter for electric railway, a DC voltage is supplied via an overhead wire situated over rail tracks and a pantograph equipped on the roof of a vehicle. In this case, the DC voltage varies moment by moment, depending greatly on the running states of vehicles in a section for which the same wire is used and on the capacity of a substation.

If the DC voltage is low, sufficient electric current cannot be made to flow by applying a voltage vector, and thus sufficient magnetic saturation of the synchronous machine cannot be obtained. Accordingly, a problem arises that magnetic-pole position information contained in a current value becomes insufficient, and the accuracy of magnetic-pole position detection is thus deteriorated. In order to avoid such a situation, the voltage vector application time needs to be made longer. However, if the DC voltage is excessively high, magnetic saturation occurs over a wide range, and the accuracy of magnetic-pole position detection is rather likely to decrease.

The present invention has been made to solve the above problems, and an object of the present invention is to provide a magnetic-pole position detection apparatus for synchronous machines that allows a desired accuracy of magnetic-pole position detection regardless of the variation in the DC voltage of the DC voltage source.

Solution to the Problems

A magnetic-pole position detection apparatus for synchronous machines according to the present invention comprises: circuit means for converting a DC voltage of a DC voltage source to voltage vectors based on a voltage vector instruction, and applying the voltage vectors to a synchronous machine having windings for n phases (n is a natural number larger than or equal to three); current detection means for detecting an electric current flowing in each of the windings of the synchronous machine; and calculation means for calculating and outputting 2n voltage vectors to the circuit means as the voltage vector instruction, and for acquiring a current detection value from the current detection means at a predetermined sampling timing based on the voltage vector instruction, the 2n voltage vectors being determined depending on the DC voltage of the DC voltage source, having equal amplitudes, having phases shifted by equal amounts in one cycle (360 degrees), and having equal predetermined pulse widths.

When the voltage vectors based on the voltage vector instruction are applied to the synchronous machine, the calculation means further calculates n added current values by adding up current detection values acquired at the sampling timing as a result of application of each pair of voltage vectors whose phases are different from each other by 180 degrees, and detects a magnetic-pole position during stoppage of the synchronous machine, based on the n added current values.

The magnetic-pole position detection apparatus comprises DC voltage detection means for detecting the DC voltage of the DC voltage source.

The calculation means controls the pulse width and the sampling timing, based on a DC voltage detection value from the DC voltage detection means, so as to obtain a desired accuracy of magnetic-pole position detection regardless of variation in the DC voltage of the DC voltage source.

Effect of the Invention

As described above, the calculation means of the magnetic-pole position detection apparatus for synchronous machines according to the present invention appropriately controls the pulse width and the sampling timing, based on the DC voltage detection value from the DC voltage detection means. Therefore, a desired accuracy of magnetic-pole position detection can be obtained regardless of variation in the DC voltage of the DC voltage source.

BEST MODE FOR CARRYING OUT THE INVENTION

Embodiment 1

Figure 1:
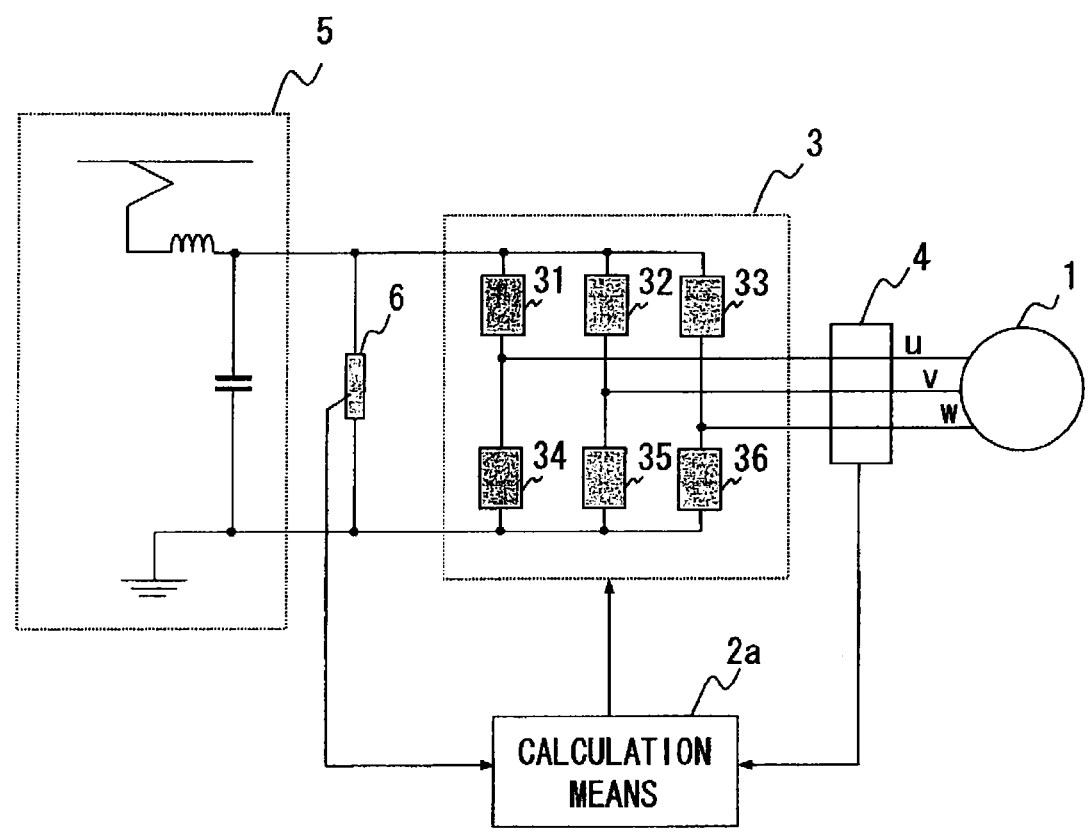
FIG. 1 is a configuration diagram of a magnetic-pole position detection apparatus for synchronous machines according to embodiment 1 of the present invention.

FIG. 1 is a block diagram showing a schematic configuration of a magnetic-pole position detection apparatus for synchronous machines according to embodiment 1 of the present invention. The flow of electric power supplied to a synchronous machine 1 will be described. A DC voltage output of a DC voltage source 5 is inputted to circuit means 3, and the circuit means 3 converts the DC voltage output to multiphase AC, and supplies the AC power to the synchronous machine 1.

Here, the synchronous machine 1 is, for example, a synchronous motor or a synchronous generator having windings for multiple phases, specifically, n phases (n is a natural number larger than or equal to three), and having a rotor on which permanent magnets are arranged. In addition, the circuit means 3 is a power converter such as a PWM inverter composed of semiconductor switches 31 to 36 such as IGBTs which are bridge-connected, and coverts a DC voltage of the DC voltage source 5 to multiphase AC, thereby outputting the multiphase AC to the synchronous machine 1.

The DC voltage source 5 outputs a DC voltage, which is to be supplied to an overhead wire situated over rail tracks, to the circuit means 3 via a pantograph equipped on the roof of a vehicle and via a filter composed of a reactor and a capacitor.

As already described, the DC voltage of the DC voltage source 5 varies moment by moment, depending greatly on the running states of vehicles in a section for which the same wire is used and on the capacity of a substation. The gist of the present invention is control taking into account the voltage variation, and will be described in detail later.

First, the operation principle of magnetic-pole position detection will be described based on the configuration shown in FIG. 1.

Calculation means 2a outputs a voltage vector instruction to the circuit means 3. Specifically, the voltage vector instruction is a combination of ON and OFF instructions for a plurality of power-conversion semiconductor switches 31 to 36 included in the circuit means 3. For example, the voltage vector instruction includes nine switching modes "V0" to "V8" defined as follows.

"V0": All the switches are off.
"V1": 31, 35, and 36 are on, and the others are off.
"V2": 31, 32, and 36 are on, and the others are off.
"V3": 34, 32, and 36 are on, and the others are off.
"V4": 34, 32, and 33 are on, and the others are off.
"V5": 34, 35, and 33 are on, and the others are off.
"V6": 31, 35, and 33 are on, and the others are off.
"V7": 31, 32, and 33 are on, and the others are off.
"V8": 34, 35, and 36 are on, and the others are off.

Figure 2:
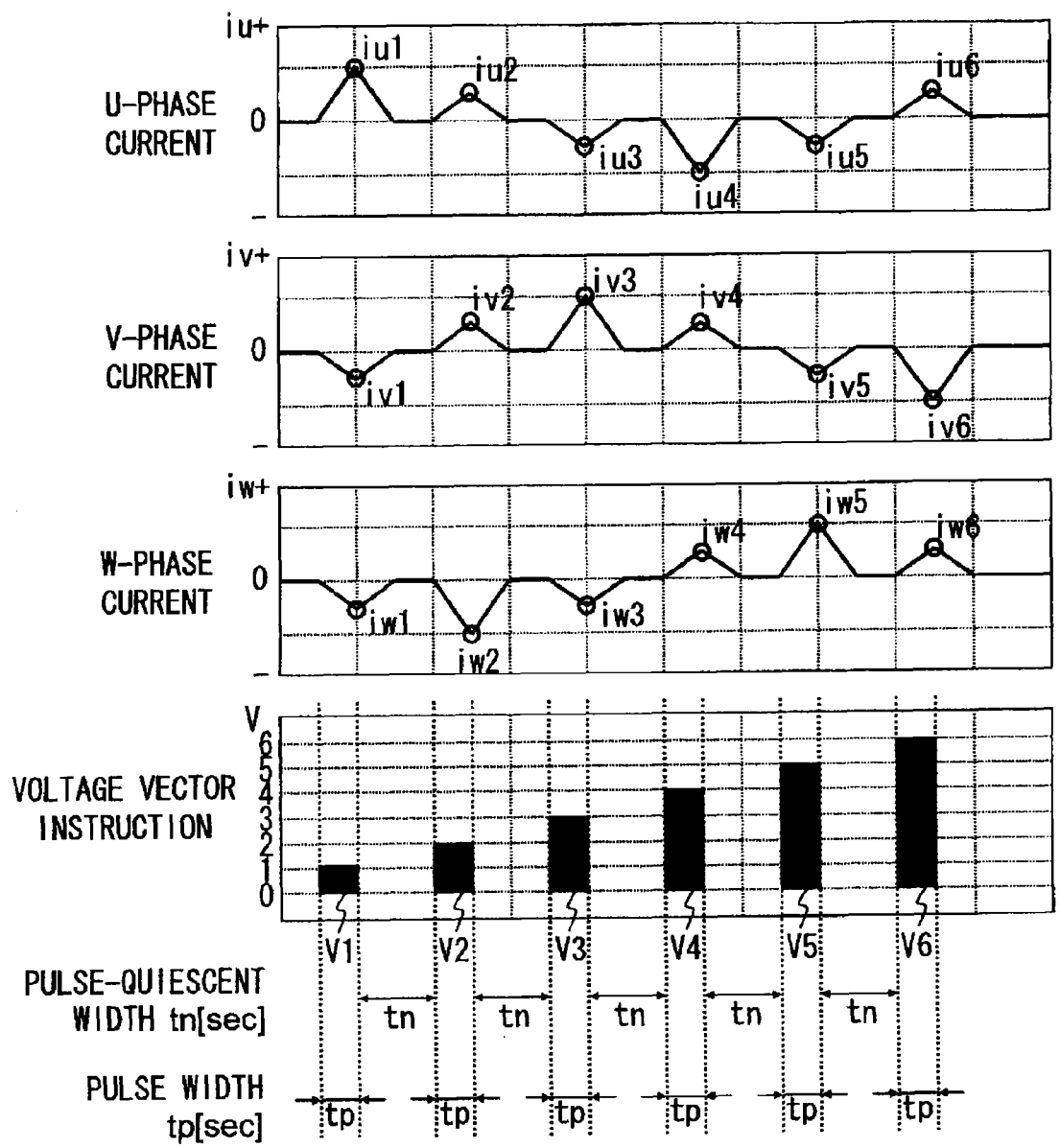
FIG. 2 is a diagram showing relationships between output timings for a voltage vector instruction and sampling timings for current detection values in calculation means 2a according to embodiment 1 of the present invention.

For example, a switching mode is applied as the voltage vector instruction in the following order: "V0"→"V1"→"V0"→"V2"→"V0"→"V3"→"V0"→"V4"→"V0"→"V5"→"V0", "V6". FIG. 2 shows the magnitudes of electric currents flowing in each phase (U phase, V phase, and W phase) of the synchronous machine 1 in that case.

Phase currents iu, iv, and iw obtained by current detection means 4 are inputted to the calculation means 2a. The values of iu, iv, and iw are sampled and stored as iu1, iv1, and iw1 at a sampling timing, namely, at the end of the application of a voltage vector by the switching mode "V1". Subsequently, the values of the phase currents at the other sampling timings, namely, at the end of the application of a voltage vector by each of the other switching modes, are similarly stored. The values of the phase currents correspond to values at circle marks shown in the phase current characteristics of FIG. 2.

The names of the sampled current values are defined as shown in Table 1.

TABLE 1

| Sampling timing | u-phase current iu | v-phase current iv | w-phase current iw |
|---|---|---|---|
| At the end of application of "V1" | iu1 | iv1 | iw1 |
| At the end of application of "V2" | iu2 | iv2 | iw2 |
| At the end of application of "V3" | iu3 | iv3 | iw3 |
| At the end of application of "V4" | iu4 | iv4 | iw4 |
| At the end of application of "V5" | iu5 | iv5 | iw5 |
| At the end of application of "V6" | iu6 | iv6 | iw6 |

Pulse widths tp of the voltage vectors applied by the switching modes "V1", "V2", "V3", "V4", "V5", and "V6" outputted as the voltage vector instruction are set to be equal to each other. A pulse-quiescent width to corresponding to the length of the all-switches-off period "V0" interposed between the applications of the voltage vectors is determined taking into account the time for the electric currents to stabilize at zero.

The voltage vectors applied by the switching modes "V1" and "V4" have directions inverted from each other by 180 degrees with respect to the synchronous machine 1, that is, form a pair of positive and negative voltage vectors for the U phase. The u-phase currents iu1 and iu4 generated at the applications have the same magnitude and opposite signs if the inductance of the synchronous machine 1 is not saturated. That is, an added current value Δiu becomes zero when it is defined by the following expression.

$$\Delta iu = iu1 + iu4 \quad (1)$$

However, in the case where the saturation state occurs in the synchronous machine 1 having permanent magnets, the condition of the magnetic saturation varies depending on whether the voltage is applied in a positive or negative direction, due to the influence of magnetic flux caused by the magnets. Therefore, the magnitudes of iu1 and iu4 become different from each other. That is, the added current value Δiu has a value other than zero in accordance with the magnetic-pole direction.

Also for the v-phase current and the w-phase current, added current values Δiv and Δiw are similarly defined by the following expressions.

$$\Delta iv = iv3 + iu6 \quad (2)$$

$$\Delta iw = iw5 + iw2 \quad (3)$$

Figure 3:
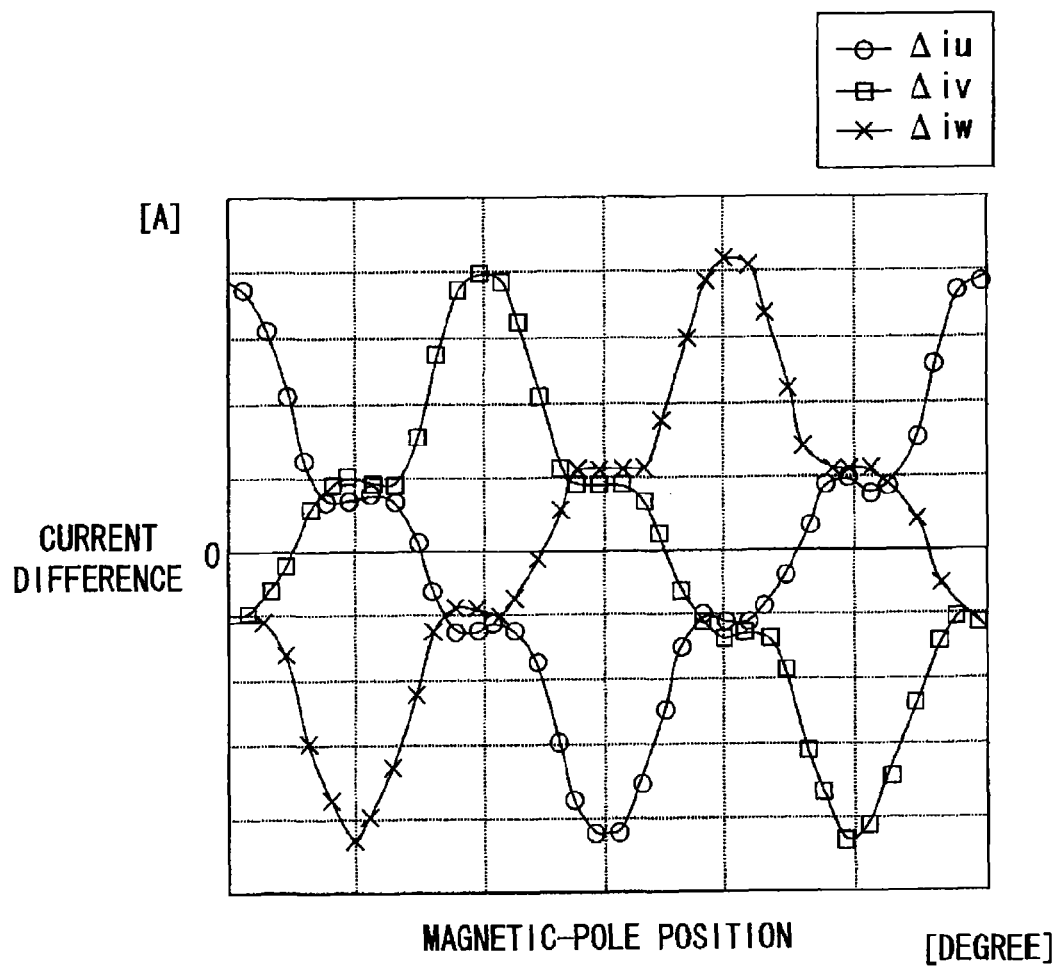
FIG. 3 is a characteristic diagram showing relationships between magnetic-pole positions and added current values $\Delta iu$, $\Delta iv$, and $\Delta iw$ obtained after detected current processing which is a principle of magnetic-pole position detection according to embodiment 1 of the present invention.

FIG. 3 shows examples of the changes of the added current values Δiu, Δiv, and Δiw with respect to the magnetic-pole position θ when the voltage vectors are applied by the switching modes as the voltage vector instruction in the order of "V1" to "V6" as shown in FIG. 2. As described above, since the condition of magnetic saturation varies depending on the magnetic-pole position, the added current values Δiu, Δiv, and Δiw have characteristics that depend on the magnetic-pole position θ.

The calculation means 2a detects the magnetic-pole position utilizing the changes of characteristics shown in FIG. 3. Specifically, as shown in Table 2, by focusing on which of the added current values Δiu, Δiv, and Δiw has the maximum absolute value and whether the sign of the signal indicating the maximum value is positive or negative, an existence section m in which the actual magnetic-pole position exists can be detected for each 60 degrees.

TABLE 2

| Section number m | Section | Δ indicating the maximum value | Sign of Δ indicating the maximum value |
|---|---|---|---|
| 1 | −30 to 30 degrees | Δiu | + |
| 2 | 30 to 90 degrees | Δiw | − |
| 3 | 90 to 150 degrees | Δiv | + |
| 4 | 150 to 210 degrees | Δiu | − |
| 5 | 210 to 270 degrees | Δiw | + |
| 6 | 270 to 330 degrees | Δiv | − |

Figure 4:
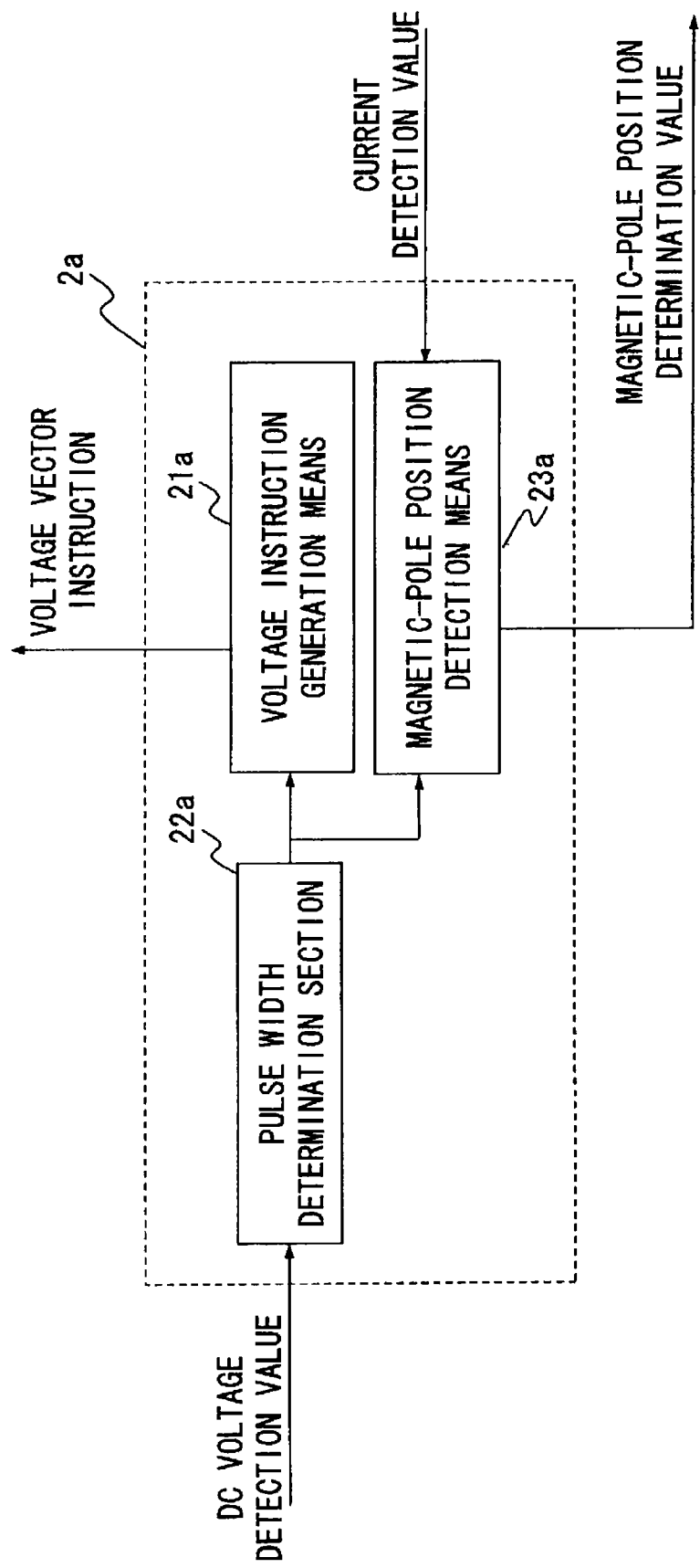
FIG. 4 is an internal configuration diagram of the calculation means 2a according to embodiment 1 of the present invention.

FIG. 4 is a block diagram showing the internal configuration of the calculation means 2a of the magnetic-pole position detection apparatus for synchronous machines according to embodiment 1 of the present invention.

According to embodiment 1, when the magnetic-pole position is detected based on the operation principle described above, the pulse width tp of each voltage vector is varied in accordance with the DC voltage value of the DC voltage source 5 detected by DC voltage detection means 6.

In FIG. 4, a pulse width determination section 22a determines the pulse width tp [sec] and the pulse-quiescent width tn [sec] in accordance with a DC voltage detection value Vdc detected by the DC voltage detection means 6.

For example, the pulse width tp and the pulse-quiescent width tn are determined by the following expressions.

$$tp = tp\text{nominal} \times Vdc\text{nominal}/Vdc \quad (4)$$

$$tn = tp \times kn \quad (5)$$

In the expressions,

Vdcnominal is a rated DC voltage value as a reference;
tpnominal is a rated pulse width as a reference; and
kn is a pulse-quiescent width setting coefficient.

Specifically, the pulse width tp is set to be inversely proportional to the magnitude of the actual DC voltage detection value Vdc. When the DC voltage detection value Vdc is smaller than the rated DC voltage value Vdcnominal, the pulse width tp is set to be large, and on the other hand, when the DC voltage detection value Vdc is larger than the rated DC voltage value Vdcnominal, the pulse width tp is set to be small. In addition, kn is a ratio of the pulse-quiescent width tn to the pulse width tp, and is set to approximately 1 to 1.5 taking into account the current decay time after the end of voltage pulse application. The current decay time depends on the constant of the synchronous machine 1 and the characteristics of the main circuit.

Based on the pulse width tp and the pulse-quiescent width tn outputted from the pulse width determination section 22a, voltage instruction generation means 21a outputs voltage vectors according to the switching modes "V1", "V2", "V3", "V4", "V5", and "V6", and the quiescent mode "V0", for the corresponding periods.

Meanwhile, magnetic-pole position detection means 23a samples current detection values from the current detection means 4 at sampling timings, namely, at the end of each pulse application for which the period is set as described above, and stores the current values as shown in Table 1, thereby making determination shown in Table 2 to output a magnetic-pole position determination value.

In the above description, the pulse width tp and the pulse-quiescent width tn are represented by the functions shown in the expressions (4) and (5). However, other functions may be used, or tabularized characteristics may be used by reference, as long as the characteristics are such that the pulse width becomes longer (shorter) as the DC voltage detection value decreases (increases).

The actual magnetic saturation characteristics of the synchronous machine 1 are complicated. The length of the pulse width tp is not exactly proportional to the peak value of the electric current flowing in the synchronous machine 1, and is not exactly inversely proportional to the DC voltage detection value. Therefore, it is preferable that the relationships among Vdc, tp, iu, iv, and iw are previously recorded by electromagnetic analysis or actual machine test, and the characteristics of tp relative to Vdc that are actually used for a product are determined based on the recorded relationships, and then are actually used in the pulse width determination section 22a by being represented by a function or a table.

According to embodiment 1 described above, the pulse width tp is determined in accordance with the DC voltage detection value Vdc. Therefore, in the case where the DC voltage detection value Vdc is smaller than the rated DC voltage value, phase currents sufficient for magnetic saturation can be generated in the synchronous machine 1 by lengthening the pulse width tp. As a result, an S/N ratio for magnetic-pole position detection can be improved, whereby the effect of improving the accuracy of magnetic-pole position detection can be obtained.

Furthermore, in the case where the DC voltage detection value Vdc is larger than the rated DC voltage value, shortening the pulse width tp can prevent magnetic saturation from occurring over an excessively wide range and thus reducing the accuracy of magnetic-pole position detection. In addition, it is possible to avoid the situation where protection of the main circuit is performed due to excessive flow of phase currents, thus obtaining the effect of allowing stable magnetic-pole position detection.

Embodiment 2

Figure 5:
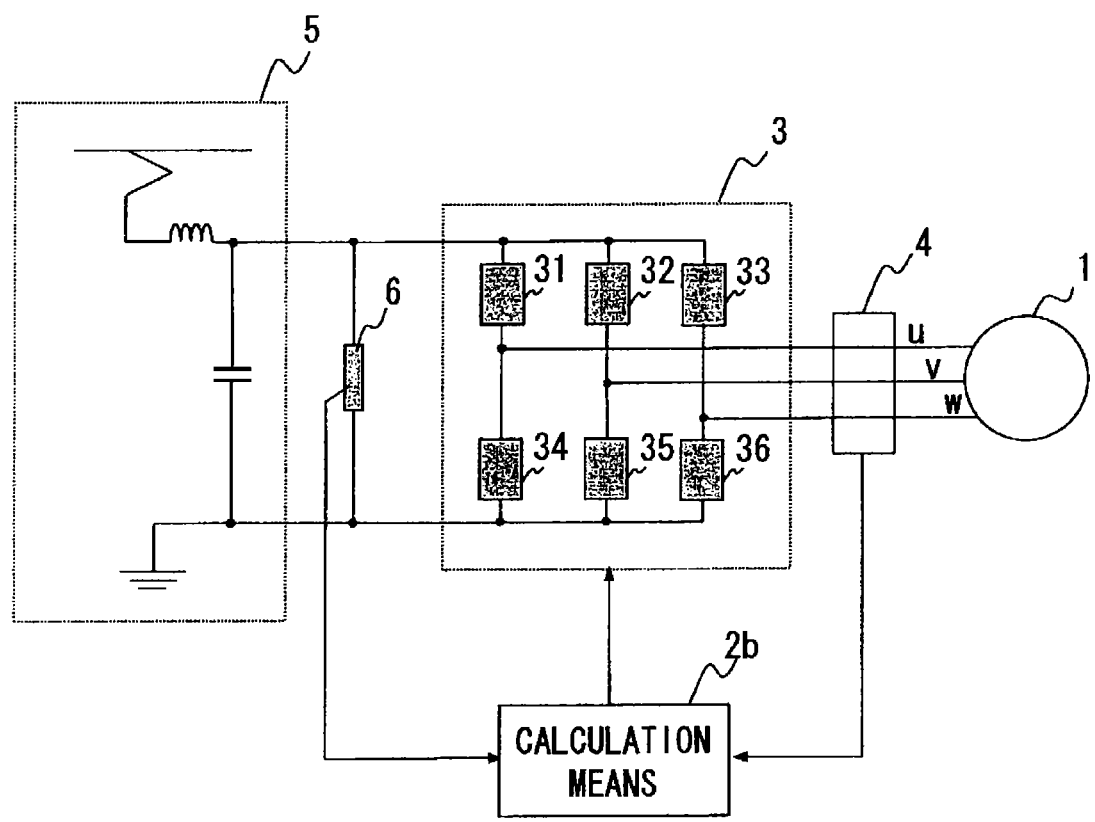
FIG. 5 is a configuration diagram of a magnetic-pole position detection apparatus for synchronous machines according to embodiment 2 of the present invention.

FIG. 5 is a block diagram showing a schematic configuration of a magnetic-pole position detection apparatus for synchronous machines according to embodiment 2 of the present invention. Components other than calculation means 2b are the same as the synchronous machine 1, the circuit means 3, the current detection means 4, the DC voltage source 5, and the DC voltage detection means 6 of embodiment 1, and the description thereof is omitted.

Figure 6:
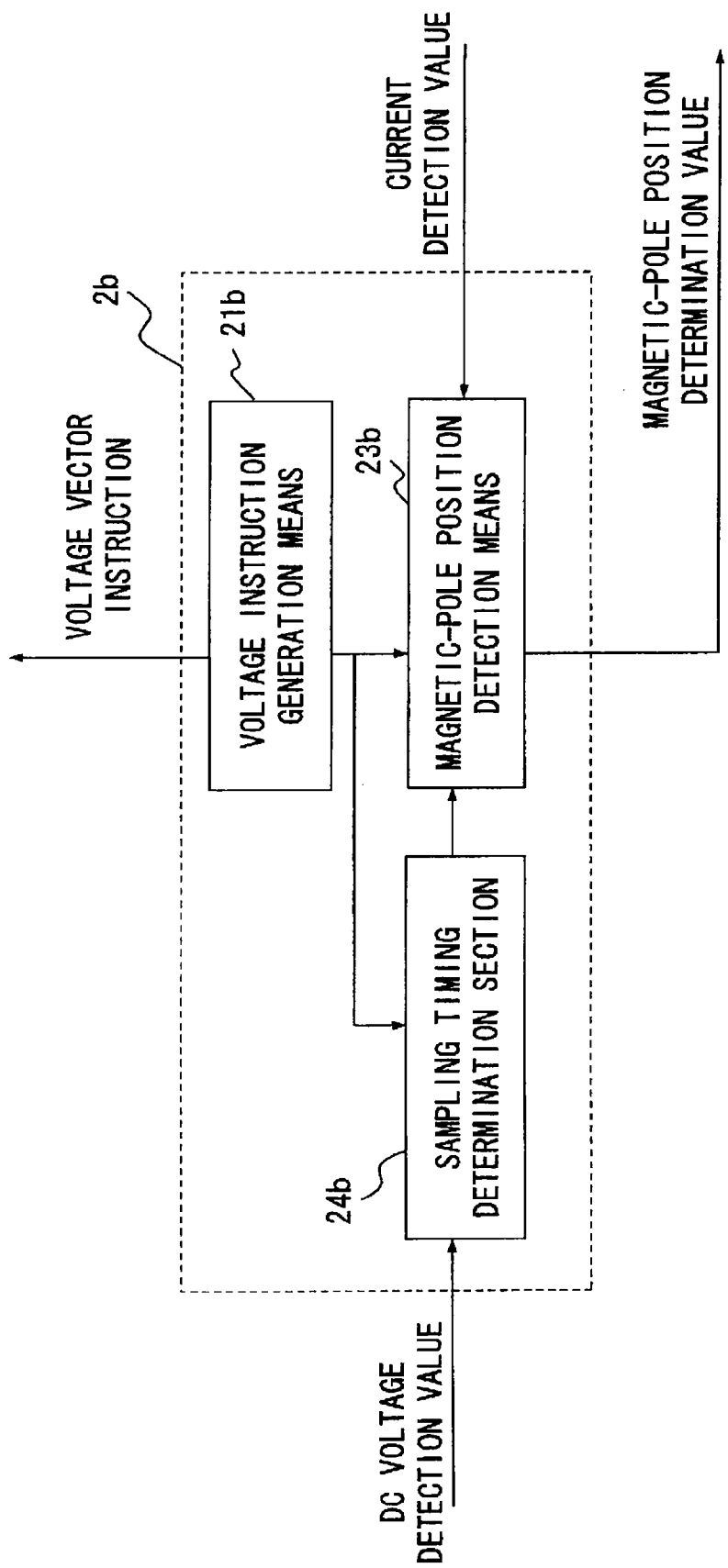
FIG. 6 is an internal configuration diagram of calculation means 2b according to embodiment 2 of the present invention.

FIG. 6 shows the internal configuration of the calculation means 2b. The calculation means 2b is composed of voltage instruction generation means 21b, magnetic-pole position detection means 23b, and a sampling timing determination section 24b.

Similarly to the voltage instruction generation means 21a of embodiment 1, the voltage instruction generation means 21b outputs, as the switching modes, "V1", "V2", "V3", "V4", "V5", and "V6" shown in Table 1, and "V0". However, the pulse width tp and the pulse-quiescent width to are set such that they are constant regardless of the DC voltage detection value Vdc.

Meanwhile, the sampling timing determination section 24b outputs a sampling instruction to the magnetic-pole position detection means 23b at a sampling timing, namely, ts seconds after electric current starts to flow in the current detection means 4 as a result of the switching mode "V1", "V2", "V3", "V4", "V5", or "V6" being outputted to the circuit means 3 as the voltage vector instruction. The magnetic-pole position detection means 23b samples and stores a current detection value at the timing, thereby sequentially storing iu1, iv1, and iw1 to iu6, iv6, and iw6 in Table 1.

Figure 7:
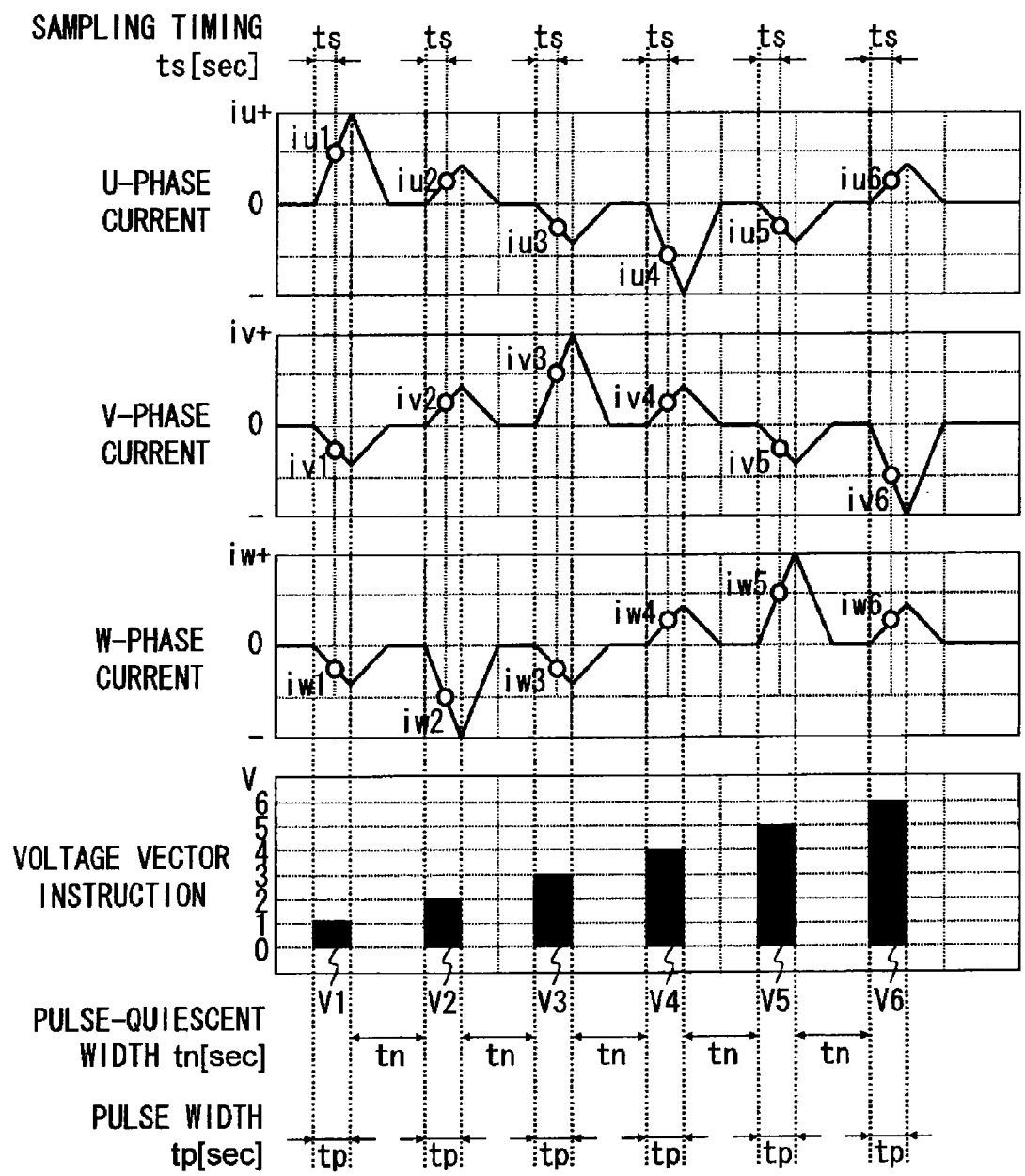
FIG. 7 is a diagram showing relationships between output timings for a voltage vector instruction and sampling timings for current detection values in the calculation means 2b according to embodiment 2 of the present invention.

FIG. 7 illustrates the above operation. The following will describe how the sampling timing determination section 24b determines ts.

Figure 8:
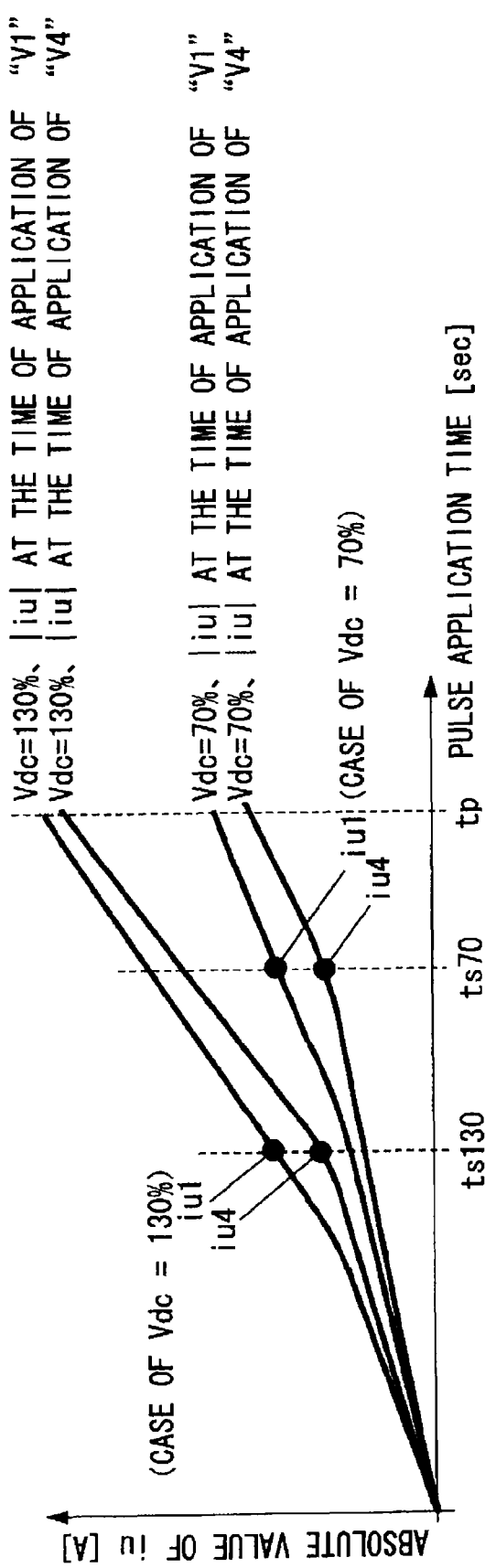
FIG. 8 is a diagram showing changes of u-phase currents within a pulse width tp when switching modes "V1" and "V4" are outputted as the voltage vector instruction, according to embodiment 2 of the present invention.

FIG. 8 is a schematic diagram showing the behaviors of the absolute values of u-phase currents in the case where the switching modes "V1" and "V4" are applied as the voltage vector instruction at the magnetic-pole position θ=0 [deg]. The case where the DC voltage detection value Vdc is 130% and the case where the DC voltage detection value Vdc is 70% are shown for each mode. The horizontal axis represents pulse application time (pulse width).

Figure 9:
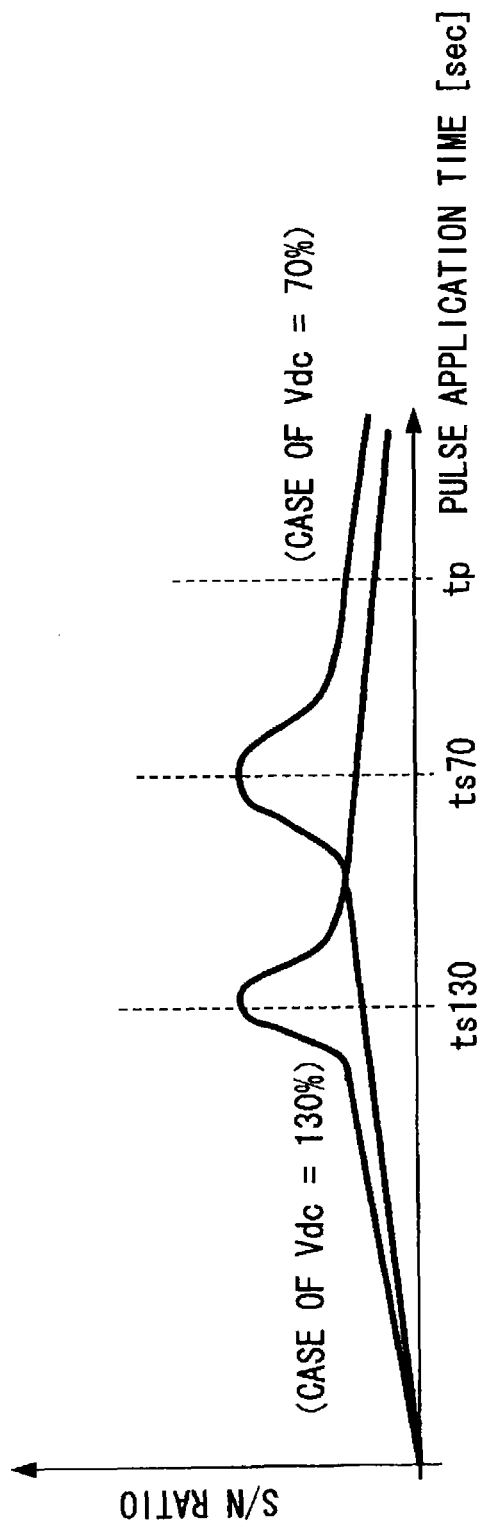
FIG. 9 is a diagram showing an S/N ratio determined from the u-phase current when the switching mode "V1" is applied and the u-phase current when the switching mode "V4" is applied, in relation to the characteristics of the u-phase currents shown in FIG. 8.

As already described, the phase angles of the voltages based on the switching modes "V1" and "V4" are directly opposite to each other along the U phase, and the u-phase currents generated in these cases have opposite signs. If magnetic saturation is not caused by magnetic pole, the magnitudes of the electric currents are equal. In fact, however, the magnitude of the electric current at the time of application of "V1" and the magnitude of the electric current at the time of application of "V4" become different due to influence of magnetic saturation caused by magnetic pole as shown in FIG. 8. By utilizing this principle, the magnetic-pole position can be detected. Here, if the DC voltage detection value Vdc is larger than a rated value, the electric current after pulse application becomes high, and the influence of magnetic saturation occurs more quickly. Although it depends on the magnetic saturation characteristics of the synchronous machine 1, the difference between the electric currents at the times of applications of the voltage instructions "V1" and "V4" reaches the maximum when, for example, the pulse application time is ts130 [sec] as shown in FIG. 8. As an indicator of the S/N ratio, FIG. 9 shows an example in which the numerator is (|iu| at the time of application of "V1"−|iu| at the time of application of "V4") and the denominator is |iu| at the time of application of "V1".

In this example, in the case of the Vdc=130%, electric currents are sampled when the pulse application time is ts130 [sec]. It can be understood that, if the electric currents are used as iu1 and iu4, the S/N ratio becomes highest, and therefore magnetic-pole detection accuracy becomes highest.

By contrast, in the case where the DC voltage detection value Vdc is small, and for example, is 70% of the rated value, generated electric current accordingly becomes small, and the time taken for the influence of magnetic saturation to occur becomes longer. In the example shown in FIGS. 8 and 9, the influence of magnetic saturation is remarkable at the timing of ts70 longer than ts130. Therefore, if current detection values sampled at the timing are stored as iu1 and iu4 in the magnetic-pole position detection means 23b, the S/N ratio for detection becomes highest. Accordingly, if sampling timings ts at which the S/N ratio becomes highest are previously acquired for each value of the DC voltage detection value Vdc by electromagnetic analysis or actual machine test, and the sampling timings ts are actually used for the sampling timing determination section 24b as the characteristics of relationship between the DC voltage detection value and the sampling timing, it is possible to maintain the highest accuracy of magnetic-pole position detection in an actual operation, by determining a sampling timing ts in accordance with the DC voltage detection value Vdc and sampling electric currents with the magnetic-pole position detection means 23b, even when the pulse width tp and the pulse-quiescent width tn of the voltage instruction outputted by the voltage instruction generation means 21b are fixed.

According to embodiment 2 described above, the sampling timings ts for current detection values are determined in accordance with change of the DC voltage detection value Vdc, and thus current detection values that provide a favorable S/N ratio can be sampled at a timing when magnetic saturation caused by magnetic pole exerts sufficient influence. Therefore, the S/N ratio for magnetic-pole position detection can be maintained at a high level, and the effect of improving the accuracy of magnetic-pole position detection can be obtained.

In addition, since the pulse width tp and the pulse-quiescent width ts are fixed regardless of the DC voltage detection value Vdc, the total time required for magnetic-pole position detection is constant regardless of the DC voltage detection value Vdc. Therefore, it is also possible to obtain the effect of facilitating the design of cooperation with a calculation process performed at the subsequent stage using the result of magnetic-pole position detection and a calculation process performed in parallel.

The method for determining the sampling timing ts that optimizes the S/N ratio, which has been described with reference to FIGS. 8 and 9, can also be applied to embodiment 1. Specifically, in embodiment 1, since the sampling timing is at the end of pulse application for which the pulse width is tp, if timings at which the S/N ratio becomes optimum as illustrated in FIGS. 8 and 9, namely, pulse widths tp that allow optimization of the S/N ratio, are previously acquired for each value of the DC voltage detection value Vdc by electromagnetic analysis or actual machine test, the effect of further improving the accuracy of magnetic-pole position detection can be obtained.

The invention claimed is:

1. A magnetic-pole position detection apparatus for synchronous machines, comprising:
    circuit means for converting a DC voltage of a DC voltage source to voltage vectors based on a voltage vector instruction, and applying the voltage vectors to a synchronous machine having windings for n phases (n is a natural number larger than or equal to three);
    current detection means for detecting an electric current flowing in each of the windings of the synchronous machine; and
    calculation means for calculating and outputting 2n voltage vectors to the circuit means as the voltage vector instruction, and for acquiring a current detection value from the current detection means at a predetermined sampling timing based on the voltage vector instruction, the 2n voltage vectors being determined depending on the DC voltage of the DC voltage source, having equal amplitudes, having phases shifted by equal amounts in one cycle (360 degrees), and having equal predetermined pulse widths, wherein
    when the voltage vectors based on the voltage vector instruction are applied to the synchronous machine, the calculation means further calculates n added current values by adding up current detection values acquired at the sampling timing as a result of application of each pair of voltage vectors whose phases are different from each other by 180 degrees, and detects a magnetic-pole position during stoppage of the synchronous machine, based on the n added current values,
    the magnetic-pole position detection apparatus comprising DC voltage detection means for detecting the DC voltage of the DC voltage source, wherein
    the calculation means controls the pulse width and the sampling timing, based on a DC voltage detection value from the DC voltage detection means, so as to obtain a desired accuracy of magnetic-pole position detection regardless of variation in the DC voltage of the DC voltage source.

2. The magnetic-pole position detection apparatus for synchronous machines according to claim 1, wherein the calculation means changes the pulse width in accordance with the DC voltage detection value, and controls the pulse width and the sampling timing such that the sampling timing is fixed at the end point of the pulse width of each of the voltage vectors regardless of the DC voltage detection value.

3. The magnetic-pole position detection apparatus for synchronous machines according to claim 2, wherein when the pulse width is tp, a pulse-quiescent width obtained by subtracting the pulse width tp from an interval between the voltage vectors temporally adjacent to each other is tn, the DC voltage detection value is Vdc, a rated DC voltage value as a reference is Vdcnominal, and a rated pulse width as a reference is tpnominal, the calculation means controls the pulse width tp and the pulse-quiescent width tn based on the following expressions:

$$tp = tpnominal \times Vdcnominal / Vdc;\ \text{and}$$

$$tn = tp \times kn,$$

wherein kn is a constant.

4. The magnetic-pole position detection apparatus for synchronous machines according to claim 2, wherein
    characteristics of relationship between the DC voltage of the DC voltage source and the pulse width that allows a desired accuracy of magnetic-pole position detection are previously determined by experiment or analysis, and
    the calculation means determines the pulse width from the characteristics of the relationship in accordance with the DC voltage detection value.

5. The magnetic-pole position detection apparatus for synchronous machines according to claim 4, wherein the characteristics of the relationship between the DC voltage of the DC voltage source and the pulse width are determined from a result obtained by previously determining a timing at which an S/N ratio becomes highest in accordance with the DC voltage of the DC voltage source by experiment or analysis, the S/N ratio being represented by the following expression:

$$S/N\ \text{ratio} = (|i1| - |i2|)/|i1|,$$

wherein i1 is a current detection value detected when a voltage vector corresponding to a known magnetic-pole position is applied, and i2 is a current detection value detected when a voltage vector whose phase is different by 180 degrees from that of the voltage vector corresponding to the known magnetic-pole position is applied.

6. The magnetic-pole position detection apparatus for synchronous machines according to claim 1, wherein
the calculation means controls the pulse width such that the pulse width has a constant value regardless of the DC voltage detection value,
characteristics of relationship between the DC voltage of the DC voltage source and the sampling timing that is in the pulse width and that allows a desired accuracy of magnetic-pole position detection, are previously determined by experiment or analysis, and
the calculation means determines the sampling timing from the characteristics of the relationship in accordance with the DC voltage detection value.

7. The magnetic-pole position detection apparatus for synchronous machines according to claim 6, wherein the characteristics of the relationship between the DC voltage of the DC voltage source and the sampling timing are determined from a result obtained by previously determining a timing at which an S/N ratio becomes highest in the pulse width in accordance with the DC voltage of the DC voltage source by experiment or analysis, the S/N ratio being represented by the following expression:

$$S/N \text{ ratio} = (|i1| - |i2|)/|i1|,$$

wherein i1 is a current detection value detected when a voltage vector corresponding to a known magnetic-pole position is applied, and i2 is a current detection value detected when a voltage vector whose phase is different by 180 degrees from that of the voltage vector corresponding to the known magnetic-pole position is applied.

* * * * *

UNITED STATES PATENT AND TRADEMARK OFFICE
CERTIFICATE OF CORRECTION

| | | |
|---|---|---|
| PATENT NO. | : 9,207,061 B2 | Page 1 of 1 |
| APPLICATION NO. | : 13/699797 | |
| DATED | : December 8, 2015 | |
| INVENTOR(S) | : Hisanori Yamasaki et al. | |

It is certified that error appears in the above-identified patent and that said Letters Patent is hereby corrected as shown below:

In the specification,

Column 5, line 38, change "width to corresponding" to --width tn corresponding--.

Column 8, line 10, change "width to are" to --width tn are--.

Signed and Sealed this
Twenty-ninth Day of March, 2016

Michelle K. Lee
*Director of the United States Patent and Trademark Office*